US012719760B2

(12) United States Patent
Karoui et al.

(10) Patent No.: US 12,719,760 B2
(45) Date of Patent: Aug. 25, 2026

(54) TRUST MANAGEMENT BASED ON DYNAMIC SUPERVISED LEARNING

(71) Applicant: Nokia Solutions and Networks Oy, Espoo (FI)

(72) Inventors: Mouna Karoui, Massy (FR); Andrea Enrici, Massy (FR)

(73) Assignee: Nokia Solutions and Networks Oy, Espoo (FI)

(*) Notice: Subject to any disclaimer, the term of this patent is extended or adjusted under 35 U.S.C. 154(b) by 51 days.

(21) Appl. No.: 18/999,029

(22) Filed: Dec. 23, 2024

(65) Prior Publication Data

US 2025/0211496 A1 Jun. 26, 2025

(30) Foreign Application Priority Data

Dec. 22, 2023 (FI) ...................................... 20236436

(51) Int. Cl.
*H04L 41/147* (2022.01)
*H04L 41/142* (2022.01)
*H04L 41/16* (2022.01)

(52) U.S. Cl.
CPC .......... *H04L 41/147* (2013.01); *H04L 41/142* (2013.01); *H04L 41/16* (2013.01)

(58) Field of Classification Search
CPC ...... H04L 41/147; H04L 41/142; H04L 41/16
See application file for complete search history.

(56) References Cited

U.S. PATENT DOCUMENTS

2016/0073271 A1 3/2016 Schultz et al.
2018/0013779 A1* 1/2018 Aguayo Gonzalez ........................ H04L 63/0876

(Continued)

FOREIGN PATENT DOCUMENTS

CN 111800421 B 8/2021
CN 113380024 B 9/2022

(Continued)

OTHER PUBLICATIONS

Extended European Search Report received for corresponding European Patent Application No. 24216084.4, dated Apr. 28, 2025, 4 pages.

(Continued)

*Primary Examiner* — Anthony Mejia
*Assistant Examiner* — Abderrahmen Chouat
(74) *Attorney, Agent, or Firm* — Robert P. Michal, Esq.; Rimon PC

(57) ABSTRACT

According to an aspect, there is provided an apparatus configured to perform the following. The apparatus obtains one or more trained hidden Markov models whose hidden and observation states define expected future and current behavior of respective one or more operational parameters of a device over time. The apparatus receives one or more messages comprising values for the one or more operational parameters for successive time instances. The apparatus determines one or more sets of successive observation states based on the one or more messages. The apparatus determines one or more probability distributions of most probable paths through the one or more hidden Markov models using a Viterbi algorithm based on the one or more sets. The apparatus determines one or more values of a trust rate based at least on dispersion in the one or more probability distributions, and classifies the device as trusted/untrusted based thereon.

20 Claims, 7 Drawing Sheets

(56) References Cited

U.S. PATENT DOCUMENTS

| | | | | |
|---|---|---|---|---|
| 2022/0126864 | A1* | 4/2022 | Moustafa | B60W 60/0013 |
| 2022/0207993 | A1* | 6/2022 | Fowe | G06N 7/01 |
| 2023/0113950 | A1* | 4/2023 | Shih | G10L 13/02 704/260 |
| 2023/0300616 | A1 | 9/2023 | Petit et al. | |
| 2025/0022066 | A1* | 1/2025 | Dyer | H04L 63/20 |

FOREIGN PATENT DOCUMENTS

| | | | |
|---|---|---|---|
| CN | 115694930 | A | 2/2023 |
| WO | 2022/235973 | A1 | 11/2022 |

OTHER PUBLICATIONS

Bayaa, "VePMAD: A Vehicular Platoon Management Anomaly Detection System, a Case Study of Car-following Mode, Middle Join and Exit Maneuvers", Case Study, Feb. 11, 2022, pp. 1-73.

Shrivastava et al., "HMM for Reputation Computation in VANET", International Conference on Computing, Communication and Automation (ICCCA), Apr. 29-30, 2016, pp. 667-670.

"Intelligent Transport Systems (ITS); Communications Architecture", ETSI EN 302 665, V1.1.1, Sep. 2010, pp. 1-44.

Road vehicles—Cybersecurity engineering, ISO/SAE 21434, First edition, Aug. 2021, 15 pages.

Rabiner et al., "An Introduction to Hidden Markov Models", IEEE ASSP Magazine, vol. 03, No. 01, Jan. 1986, pp. 4-16.

"Road vehicles—Extended data link security", ISO 15764, First edition, Aug. 15, 2004, 13 pages.

"Road vehicles—Security certificate management", ISO 20828, First edition, Jul. 1, 2006, 13 pages.

Gyawali et al., "Machine Learning and Reputation Based Misbehavior Detection in Vehicular Communication Networks", IEEE Transactions on Vehicular Technology, vol. 69, No. 08, Aug. 2020, pp. 8871-8885.

Liao et al., "Anomaly Detection Based on Selection and Weighting in Latent Space", IEEE 17th International Conference on Automation Science and Engineering (CASE), Aug. 23-27, 2021, pp. 409-415.

Moso et al., "Anomaly Detection on Roads Using C-ITS Messages", Communication Technologies for Vehicles, Nov. 16-17, 2020, pp. 25-38.

Azmi et al., "Dynamic Reputation Based Trust Management Using Neural Network Approach", International Journal of Computer Science Issues, vol. 08, No. 05, Sep. 2011, pp. 161-165.

"Event-Driven Automation", Nokia, Retrieved on Apr. 1, 2025, Webpage available at : https://www.nokia.com/data-center-networks/data-center-fabric/event-driven-automation/.

Ryan et al., "The Viterbi Algorithm", Research Report, Feb. 12, 1993, pp. 1-17.

"13.1—Weighted Least Squares", PennState, Retrieved on Apr. 1, 2025, Webpage available at : https://online.stat.psu.edu/stat501/lesson/13/13.1.

Debray et al., "Weighted Decision Trees", Thesis, Sep. 1996, 15 Pages.

"The Smart-Data Platform Generate only the most relevant data from your Autonomous Systems", Heex, Retrieved on Apr. 1, 2025, Webpage available at : https://www.heex.io/.

Kumar et al., "A Privacy-Preserving-Based Secure Framework Using Blockchain-Enabled Deep-Learning in Cooperative Intelligent Transport System", IEEE Transactions on Intelligent Transportation Systems, vol. 23, No. 09, Sep. 2022, pp. 16492-16503.

Singh et al., "Blockchain Meets AI for Resilient and Intelligent Internet of Vehicles", arXiv, Dec. 28, 2021, pp. 1-9.

Office Action received for corresponding Finnish Patent Application No. 20236436, dated Jul. 22, 2024, 14 pages.

* cited by examiner

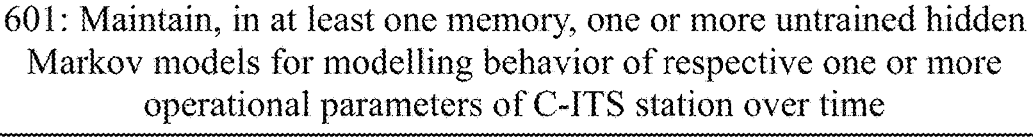

602: Obtain training data comprising, for each of one or more operational parameters, set of observation states and corresponding set of known hidden states 603: Train one or more emission matrices of respective one or more untrained hidden Markov models based on training data to form one or more trained hidden Markov models 604a: Output one or more trained hidden Markov models
OR
604b: Perform process of any of Figures 3, 4 and 5A (+ 5B)

Fig. 6

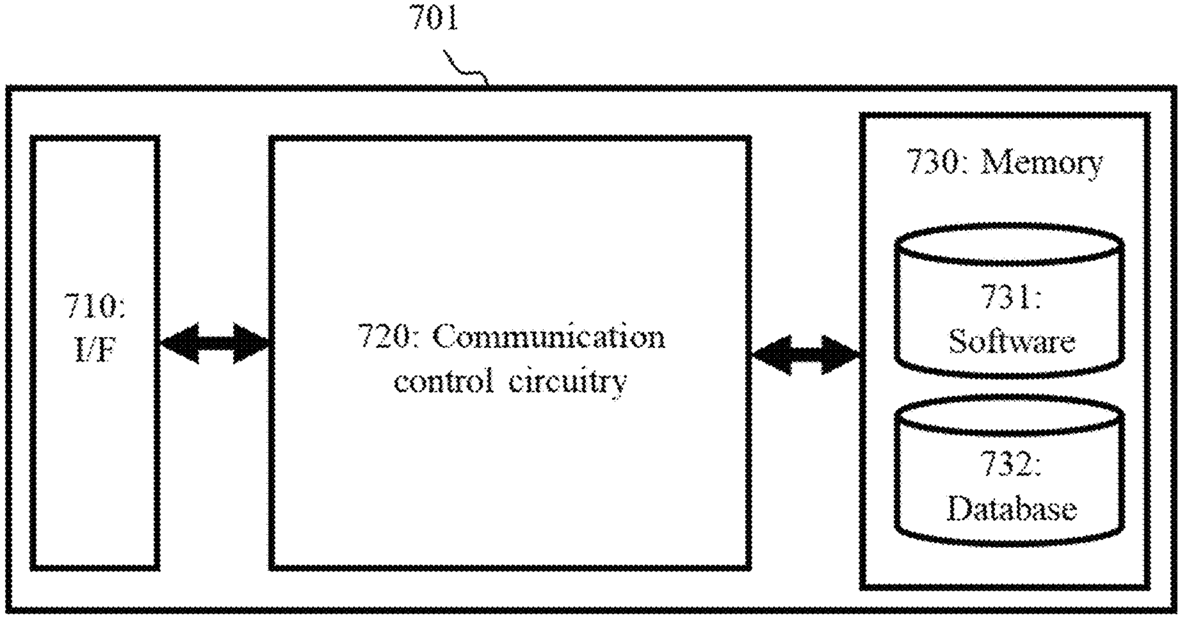

Fig. 7

TRUST MANAGEMENT BASED ON DYNAMIC SUPERVISED LEARNING

TECHNICAL FIELD

Various example embodiments relate to wireless communications.

BACKGROUND

A cooperative intelligent transport system (C-ITS) is a transport system comprising two or more C-ITS stations (comprising, e.g., personal, vehicle, roadside and/or central sub-systems) which co-operate with each other so as to enable and provide an intelligent transport system (ITS) service that offers better quality and an enhanced service level compared to the same ITS service provided by only one of the ITS sub-systems. Ideally, data transmitted within C-ITS stations, between C-ITS stations and/or from and to C-ITS stations should be protected to ensure their confidentiality and integrity. However, in some cases, a malicious party may still be able to access and manipulate this data (e.g., causing a change in position, speed or other internal parameters of a vehicular C-ITS station). Thus, there is also a need for a dependable trust mechanism for making trust decisions regarding C-ITS stations, that is, for determining whether a given C-ITS station is to be trusted.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

FIG. 6 illustrates a process according to some embodiments;

FIG. 7 illustrates an apparatus according to some embodiments.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
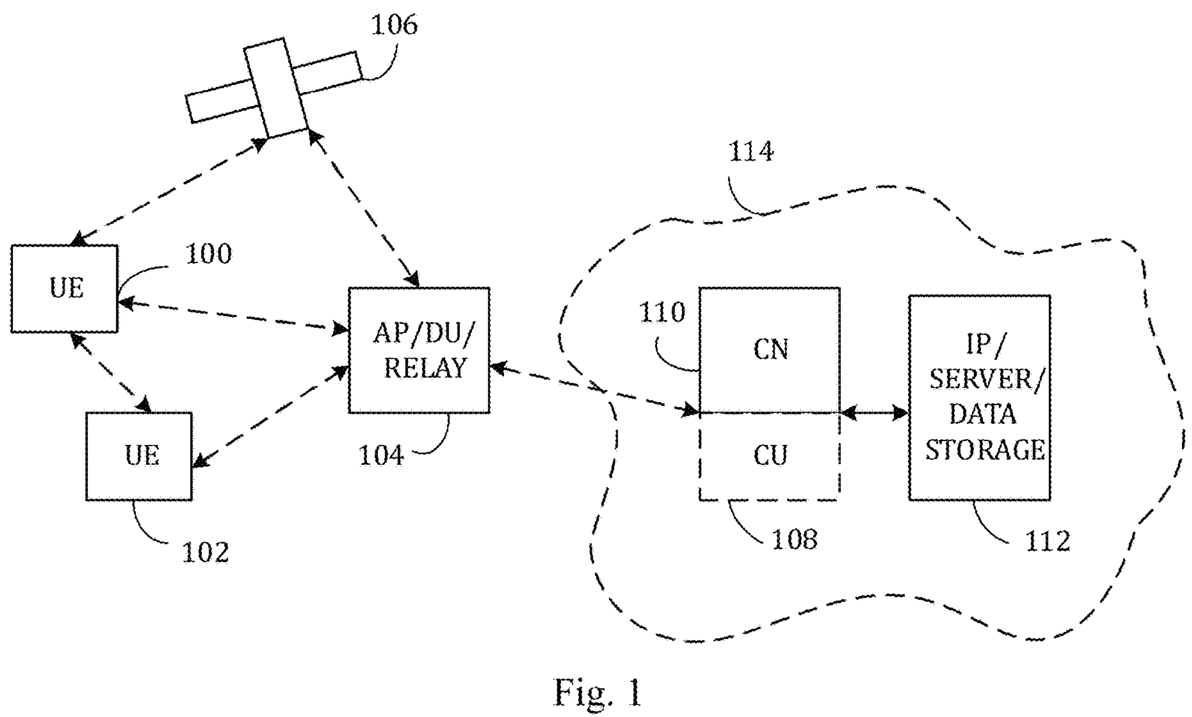
FIG. 1 illustrates a system to which some embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

A communications system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. The user equipment may comprise a mobile equipment and at least one universal integrated circuit card (UICC).

The user device typically refers to a portable computing device that includes wireless mobile communication devices operating with or without a subscriber identification module (SIM) or UICC, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Thus, the user devices may not enable direct user interaction or may enable only limited user interaction (e.g., during setup). The user device (or in some embodiments a layer 3 relay node) is configured to perform one or more of user equipment functionalities. The user device may also be called a terminal device, a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements con-trolling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into the RAN by utilizing network function virtualization (NVF) and software defined networking (SDN). Using edge cloud may mean access node operations to be carried out, at least partly, in a server, host or node operationally coupled to a remote radio head or unit (RU) or base station comprising radio parts. It is also possible that node operations will be distributed among a plurality of servers, nodes or hosts. Application of cloud-RAN architecture enables RAN real time functions being carried out at the RAN side (in a distributed unit, DU 104) and non-real time functions being carried out in a centralized manner (in a central or centralized unit, CU 108). Thus, in summary, the RAN may comprise at least one distributed access node comprising a central unit, one or more distributed units communicatively connected to the central unit and one or more (remote) radio heads or units, each of which is communicatively connected to at least one of the one or more distributed units.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home(e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H(e/g) nodeBs), a home node B gateway, or HNB-GW (not shown in FIG. 1). A HNB Gateway (HNB-GW), which is typically installed within an operator's network may aggregate traffic from a large number of HNBs back to a core network.

6G architecture is targeted to enable easy integration of everything, such as a network of networks, joint communication and sensing, non-terrestrial networks and terrestrial communication. 6G systems are envisioned to encompass machine learning algorithms as well as local and distributed computing capabilities, where virtualized network functions can be distributed over core and edge computing resources. Far edge computing, where computing resources are pushed to the very edge of the network, will be part of the distributed computing environment, for example in "zero-delay" scenarios. 5G systems may also employ such capabilities. More generally, the actual (radio) communication system is envisaged to be comprised of one or more computer programs executed within a programmable infrastructure, such as general-purpose computing entities (servers, processors, and like).

Figure 2:
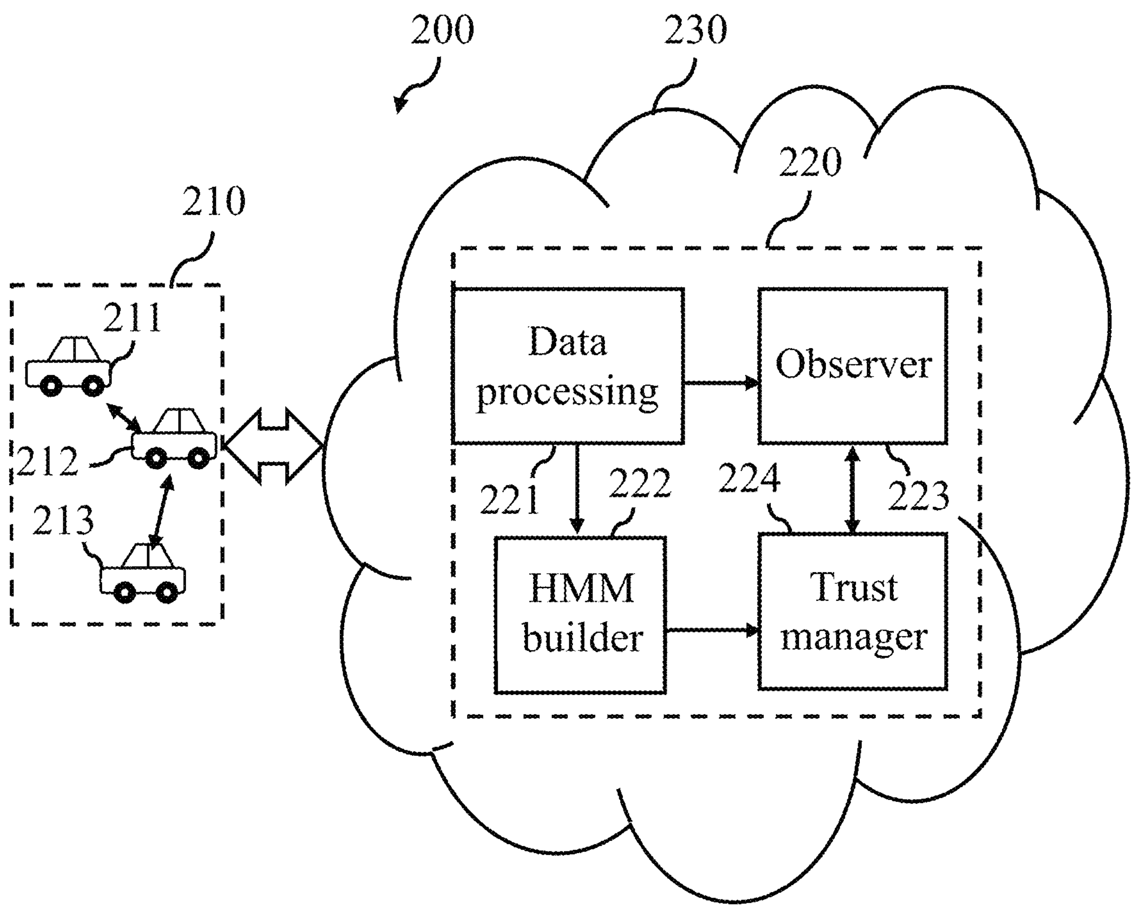
FIG. 2 illustrates a system according to some embodiments.

FIG. 2 illustrates an architecture of a system 100 according to embodiments. FIG. 2 illustrates a simplified system architecture only showing some elements and functional entities. It is apparent to a person skilled in the art that the system may also comprise other functions and structures.

The system 200 corresponds to a co-operative intelligent transport system (C-ITS). The distributed monitoring system 200 of FIG. 2 comprises a C-ITS wireless communication system (or network) 210 and a C-ITS edge cloud 230 connected to the distributed C-ITS communication system. The C-ITS edge cloud 230 comprises a trust management entity (or module or function) 220.

The C-ITS wireless communication system (or network) 210 comprises a plurality of C-ITS stations 211 to 213 distributed in a transport (or specifically road) environment. A C-ITS station may be defined, in general, as a set of hardware and software components for (or configured to) collect, store, process, receive and transmit secured and trusted messages in order to enable the provision of a C-ITS service. Namely, said plurality of C-ITS stations 211 to 213 co-operate with each other so as to enable and provide an ITS service that offers better quality and an enhanced service level compared to the same ITS service provided by only one of the ITS sub-systems.

While FIG. 2 shows the plurality of C-ITS stations 211 to 213 to be cars, said plurality of C-ITS stations 211 to 213 may, in general, comprise, for example, one or more personal C-ITS stations (being, e.g., user devices of pedestrians, cyclists and/or motorcyclists), one or more vehicular C-ITS stations (being, e.g., cars, trains and/or trams), and/or one or more (stationary) roadside C-ITS stations. Thus, C-ITS communication may occur between vehicles (vehicle-to-vehicle, V2V), vehicles and road infrastructure (vehicle-to-infrastructure, V2I or I2V), vehicles and other (vulnerable) road users such as pedestrians, cyclists or motorcyclists (vehicle-to-everything, V2X), and between elements of the road infrastructure (infrastructure-to-infrastructure, I2I), such as traffic lights, cameras, sensors, variable message signs (VMS) and/or traffic information centers (TMC).

The plurality of C-ITS stations 211 to 213 may communicate with each other by exchanging C-ITS messages with each other. These C-ITS messages may also be shared with the C-ITS edge cloud 230. These C-ITS messages may comprise, for example, cooperative awareness message (CAMs) and/or decentralized environmental notification message (DENMs).

Examples of functionalities provided by the C-ITS wireless communication system 210 (that is, provided by the associated C-ITS service) may comprise sharing sensor data (e.g., video from the car in front of your own car), sharing control information so as to allow vehicles to drive in close formation, saving road space and exchanging vehicle trajectories to prevent collisions.

Data transmitted within the plurality of C-ITS stations 211 to 213, between the plurality of C-ITS stations 211 to 213 or from and to the plurality of C-ITS stations 211 to 213 may be protected using a security scheme to guarantee confidentiality and integrity of the transmitted data. This may be especially important when the plurality of C-ITS stations 211 to 213 are vehicular C-ITS stations (and thus reception of incorrect/manipulated data has a potential to cause serious accidents). Depending on the protection requirements, different security schemes may be used. For example, ISO 15764 defines one extended security scheme. It does not just restrict the access to data, but protects the data when transmitted over the data link. Protection is provided against masquerade, replay, eavesdropping, manipulation and repudiation. Moreover, before starting the secured data transmission, the data link must be established as a secured link. ISO 15764 provides two methods for this:

a) Both devices participating in the data transmission have a pre-established secret cryptographic key. This key is used to establish the secured link and excludes all third parties not having access to it from participating in the secured link. This method is based on symmetric keys and is applicable to devices with a limited processing power and memory.

b) The secured link may be established between arbitrary devices, if these devices have a private key and a security certificate for the corresponding public key. This method involves asymmetric cryptography requiring a higher amount of processing power and memory at the devices.

Public keys are cryptographic keys that are publicly available and are linked to a private key, which is kept secret by the device owning it. There are two ways of using a public/private key pair:

a) The device owning the private key may add an electronic signature to data it sends out. This signature is specific for the data sent out and may only be generated with the private key. Both a different data string to be signed and a different private key would lead to a different signature. Any other device possessing the corresponding public key is able to verify the signature and therefore to confirm that the data string originates from the device owning the private key and has not been altered after being sent out.

b) Any device possessing the public key may use it to encrypt data before sending it to the device owning the private key. As the data can only be decrypted with the aid of the private key, no other device is able to correctly interpret the data sent out.

But how does the user of the public key know that it uses the correct one? A malicious third party could send its own public key, pretending it is from a trusted device, and could hope to get access to the secured data transmissions. For each domain of secured data transmissions, there must be an authority (or several of them) deciding which devices can be trusted. This is called Certification Authority. For the trusted devices, it issues security certificates, confirming that the public key is from that device (meaning that the device owns the corresponding private key).

The C-ITS edge cloud 230 comprises a distributed network of computing resources (e.g., processors, memories etc.) and/or computing devices or equally a distributed network of C-ITS edge nodes. According to the basic edge computing concept, the C-ITS edge cloud 230 is located at the edge of the C-ITS wireless communication system 210 for enabling low latency data processing and real-time decision-making.

In connection with embodiments, the C-ITS edge cloud 230 is assumed to comprise or implement a trust management entity (or module or function) 220 for establishing trustworthiness of the plurality of C-ITS stations 211 to 213. Specifically, the trust management entity may be implemented by a particular C-ITS edge node of the C-ITS edge cloud 230. The trust management entity 220 may, for example, be or form a part of an edge network controller for controlling the C-ITS edge cloud 230.

In the following, the functionalities associated with the elements 221 to 224 are discussed only briefly with a more detailed description of these functionalities being provided below in connection with FIGS. 3, 4, 5A, 5B and 6.

The trust management entity 220 may comprise the following four logical elements: a data processing function (or entity) 221, a hidden Markov model builder 222, an observer 223 and a trust manager 224.

The data processing function 221 is configured to receive raw C-ITS message data from the plurality of C-ITS stations 211 to 213 and process it for use by the other functions 222 to 224. This operation may be carried out, for each of the plurality C-ITS stations, periodically (e.g., every ten minutes) or regularly. The processing of the raw C-ITS message data may comprise determining values of one or more operational parameters of each of the C-ITS stations 211 to 213 (based on which the subsequent analysis is carried out) over a (pre-defined) sliding time window based on the raw C-ITS message data. The one or more operational parameters may comprise, for example, an end-to-end (E2E) delay, throughput, bandwidth, a location, a speed, a velocity, an acceleration, a direction of movement, and/or a transmission frequency. Finally, the data processing function may determine if any road disruptions or events (e.g., accidents) occurred during said sliding time window based on the raw C-ITS message data.

The HMM builder 222 is configured, as the name implies, to generate and update one or more HMMs based on the values of the one or more operational parameters of each of the C-ITS stations 211 to 213 obtained via the data processing function 213. Namely, each of the one or more operational parameters defined for a C-ITS station 211 to 213 may be associated with a dedicated HMM configured to model behavior of that operational parameter.

According to a general definition, a Hidden Markov Model (HMM) is a finite model that describes a probability distribution over an infinite number of possible sequences. The hidden Markov model may be equally called a hidden Markov chain. The HMM is composed of a number of states, which might correspond to positions in a 3D structure or columns of multiple alignments. Each state 'emits' symbols (residues) according to symbol-emission probabilities, and the states are interconnected by state-transition probabilities. Starting from some initial state, a sequence of states is generated by moving from state to state according to the state-transition probabilities until an end state is reached. Each state then emits symbols according to that state's emission probability distribution, creating an observable sequence of symbols. The sequence of states is a Markov chain because the choice of the next state to occupy is dependent on the identity of the current state. However, this state sequence is not observed: it is hidden. Only the symbol sequence that these hidden states generate is observed. The most likely state sequence must be inferred from an alignment of the HMM to the observed sequence. A more specific definition of the HMM(s) as used in embodiments is provided in connection with FIG. 3.

The observer 223 is configured to determine, per C-ITS station 211 to 213, a value of an uncertainty metric corresponding to the sliding time window based on a value of a false detection rate of the classification performed by the trust manager 224 and a probability of road disruptions (or events) based on previous road disruptions detected by the data processing function 221. Here, the uncertainty metric is a metric quantifying uncertainty regarding how well atypical (or abnormal) changes (e.g., sudden changes) in the one or more operational parameters correlate with trustworthiness of the C-ITS station. The assumption here is that if there is a large number of road disruptions within a certain time slot, it is expected that a given (vehicular) C-ITS station will likely not operate in a normal or typical manner and thus this atypical operation (which may, in fact, be considered typical if the prevailing special circumstances are taken into account) should not significantly affect the trustworthiness of the C-ITS station. On the other hand, if there are no road disruptions, the C-ITS station should be expected to operate in a normal or nominal manner. In order to evaluate the false detection rate, the observer 223 may be configured to periodically or regularly obtain information on behavior of the C-ITS stations 211 to 213 from the C-ITS stations 211 to 213 via the data processing function 221.

The trust manager 224 may comprise two separate function entities: a trust rate calculator and a trust classifier. The trust rate calculator is configured to calculate, per operational parameter of a C-ITS station, a value of a trust rate based on the value of the uncertainty metric obtained via the observer 223 and a probability of the most likely hidden state sequence (or at least based on said probability). Said uncertainty metric is a metric quantifying uncertainty regarding how well atypical (or abnormal) changes (e.g., sudden changes) in the one or more operational parameters correlate with trustworthiness of the C-ITS station. The uncertainty metric may be dependent on information obtained via the observer (i.e., the false detection rate and/or probability of road disruptions or events). Said probability of the most likely hidden state sequence is determined based on an associated trained hidden Markov model obtained via the HMM builder 222. The trust classifier is configured to classify each of the plurality of C-ITS stations as trusted or untrusted based on the calculated values of the trust rate. This classification may be updated periodically or regularly.

Figure 3:
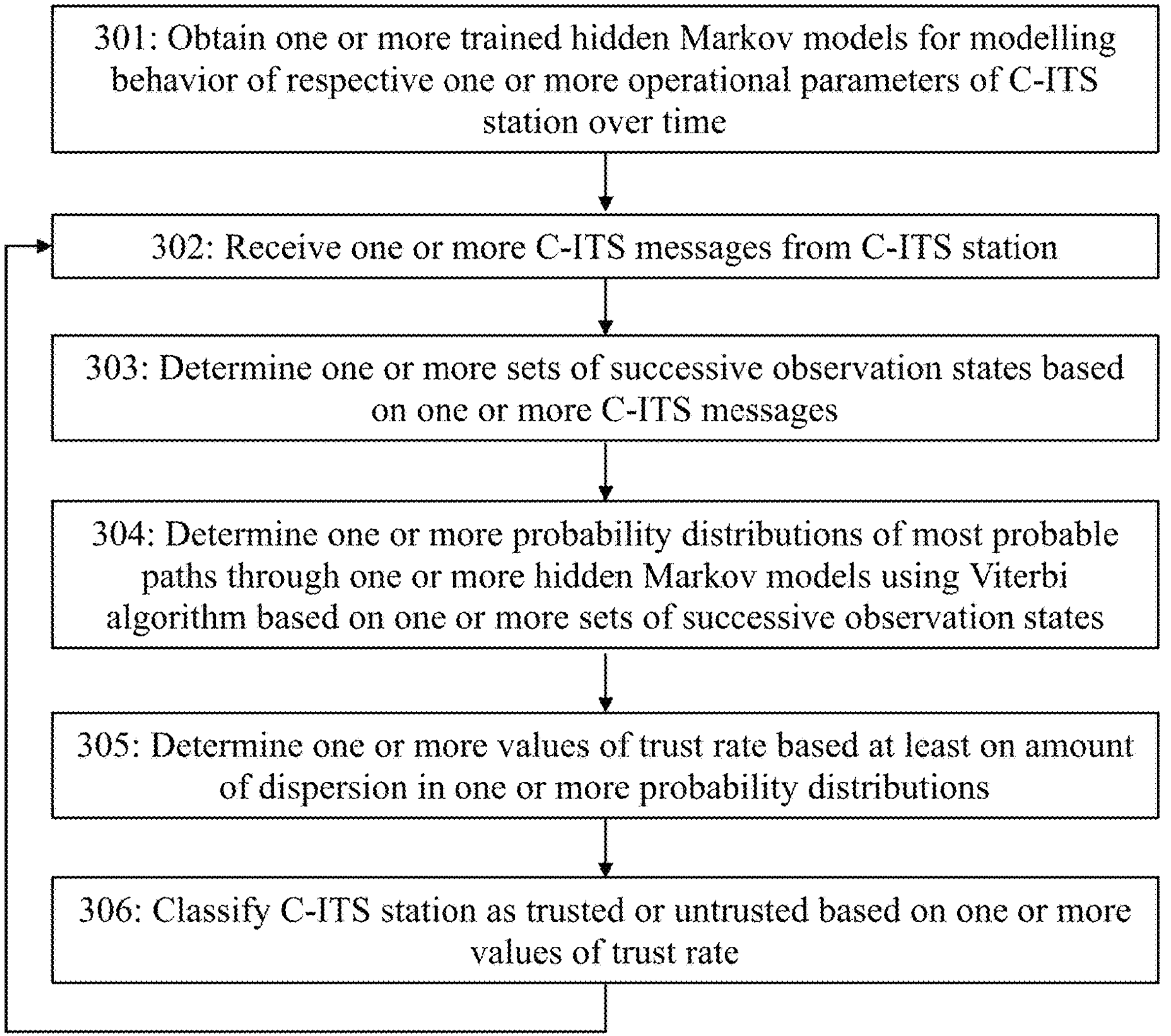
FIGS. 3, 4, 5A and 5B illustrate processes according to some embodiments.

FIG. 3 illustrates a process for evaluating trustworthiness of a C-ITS station according to embodiments. The process of FIG. 3 may be carried out by a C-ITS edge cloud node or another apparatus or system comprised in or connected to a C-ITS edge cloud. The apparatus carrying out the process of FIG. 3 may correspond to element 220 of FIG. 2. The illustrated functionalities may be carried out by one or more physical devices (e.g., servers). In the following, the entity carrying out the process of FIG. 3 is called an apparatus for simplicity.

Referring to FIG. 3, the apparatus obtains, in block 301, one or more trained hidden Markov models for modelling behavior of respective one or more operational parameters of a C-ITS station (being, e.g., a vehicular C-ITS station) over time. According to a general definition of a hidden Markov model, each of one or more hidden Markov models comprise a set of hidden states, which are not directly observed, and a set of observation (or observable) states (equally called emissions), where the transitions between hidden states are governed by probabilities. Here, hidden states of the one or more trained hidden Markov models define expected future behavior of the respective one or more operational parameters, and observation states of the one or more trained hidden Markov models define current states of the respective one or more operational parameters.

A sequence of observation states may be observed and used as an input of each of the one or more hidden Markov models. The sequence of observations may correspond to a pre-defined sliding time window. The sequence of observations for a given hidden Markov model may be defined as $$Y = \{y_1, y_2, \ldots, y_T\}, \tag{1}$$

where 1, 2, . . . , T are time indices corresponding to time instances within the pre-defined sliding time window (i.e., '1' indicates an initial observation over time and 'T' indicates Tth and last observation over time for that time window). Each of the one or more hidden Markov models may be associated with a different sequence of observation (of equal length). Each of the observation states $y_1$, $y_2$, . . . , $y_T$ is selected from an observation state space O defined as $$O = \{o_1, o_2, \ldots, o_N\}, \tag{2}$$

where $o_1$, $o_2$, . . . , $o_N$ are states which may be observed at a given time t with N being a positive integer indicating the total number of different observation states. Thus, 1, 2, . . . , N are indices corresponding to different possible observation states. For example, $o_1$, $o_2$, . . . , $o_N$ may describe observed behavior of a given operation parameter (e.g., "normal operation" and "abnormal operation"). Accordingly, the sequence of observations Y may have, for example, the following form for some observed time window $Y=\{o_3, o_3, o_3, o_1, o_2, o_2, o_1\}$.

A set of hidden states may be defined for each of the one or more hidden Markov models. This set of hidden states corresponds, respectively, to the sequence of observation states observed over the pre-defined sliding time window. Each state of the set of hidden states may be a state comprised in the hidden state space S which defines all different types of hidden states. Mathematically, the hidden state space S for each operational parameter of each of the one or more hidden Markov models may be defined as $$S = \{s_1, s_2, \ldots, s_K\}, \tag{3}$$

where 1, 2, . . . , K are indices corresponding to different hidden states (e.g., a state indicating an increasing value of operational parameter, a state indicating a decreasing value of operational parameter etc.). Thus, K is a positive integer. How the individual state may be defined is discussed separately below.

An array H of initial probabilities ($\pi_1$, $\pi_2$, . . . , $\pi_K$) defining the transitions between the hidden states may be defined for a given hidden Markov model as $$\Pi = \{\pi_1, \pi_2, \ldots, \pi_K\}, \tag{4}$$

where $\pi_i$ is the probability that a given hidden Markov model will start in state $s_i$ (i having integer values from 1 to K). The initial probability array H may be defined so as to satisfy the following condition:

$$\sum_{i=1}^{K} \pi_i = 1. \tag{5}$$

The probabilities in the array H may be initialized, by the apparatus, e.g., using a random uniform distribution giving values between 0 and 1. The state transitions may be collected to a transition matrix A of size K×K such that element $A_{ij}$ stores the transition probability of transitioning from state $s_i$ to state $s_j$.

Emission matrix B of size K×N such that $B_{ij}$ stores the probability of observing observation state $o_j$ from hidden state $s_i$. It is the probability of hidden state generating output vi given that state at the corresponding time was $s_i$. The apparatus may initialize the emission matrix B by uniformly segmenting the training data and computing the global mean and variance for each segment $s_i$. Alternatively, the apparatus may obtain the trained emission matrix B from another apparatus.

In some embodiments, the (different) hidden states ($s_1, s_2, \ldots, s_K$) of each of the one or more trained hidden Markov models comprise at least (or consist of):

- one or more states indicating (predicted) future increase of respective one or more different magnitudes in an associated operational parameter,
- one or more states indicating (predicted) future decrease of respective one or more different magnitudes in the associated operational parameter and
- a state indicating that the associated operational parameter remains substantially unchanged in the future.

The expression "substantially unchanged" (or equally "substantially constant") may be defined, here and in the following, to mean that the change is within a pre-defined range. Thus, if the change in an operational parameter is not within this pre-defined range, the hidden state is here equal to one of the one or more states indicating future increase or the one or more states indicating future decrease. The increase/decrease of different magnitudes (here and in the following definitions) may be associated with different ranges of positive/negative slopes (or gradients) of the associated operational parameter, respectively. To give a more concrete non-limiting example, the hidden state space for each of the one or more hidden Markov models may comprise the following different (mutually exclusive) states: a major future increase in the value of the operational parameter, a minor future increase in the value of the operational parameter, a major future decrease in the value of the operational parameter, a minor future decrease in the value of the operational parameter and a value of the operational parameter remains substantially constant in the future.

In one special case of the embodiments described in the previous paragraph, the hidden states ($s_1, s_2, \ldots, s_K$) of each of the one or more trained hidden Markov models comprise at least (or consist of): a state indicating future increase in an associated operational parameter, a state indicating future decrease in the associated operational parameter and a state indicating that the associated operational parameter remains substantially unchanged in the future. The expression "substantially unchanged" may be defined to mean that the change is within a pre-defined range. Thus, if the change of an operational parameter is not within this pre-defined range, the hidden state is equal to the state indicating future increase in an associated operational parameter or the state indicating future decrease in an associated operational parameter.

The observation states may be defined in analogous manner to the hidden states. Thus, in some embodiments, the observation states ($o_1, o_2, \ldots, o_N$) of each of the one or more trained hidden Markov models comprise at least (or consist of): one or more states indicating increase of respective one or more different magnitudes in an associated operational parameter, one or more states indicating decrease of respective one or more different magnitudes in the associated operational parameter and a state indicating that the associated operational parameter is substantially unchanged. For example, the observation states of each of the one or more trained hidden Markov models may comprise at least (consist of) the following (mutually exclusive) states: a state indicating an increase in an associated operational parameter, a state indicating a decrease in the associated operational parameter and a state indicating that the associated operational parameter is substantially unchanged. To give another non-limiting example, the hidden state space for each of the one or more trained hidden Markov models may comprise the following different (mutually exclusive) states: a major increase in the value of the operational parameter, a minor increase in the value of the operational parameter, a major decrease in the value of the operational parameter, a minor decrease in the value of the operational parameter and a value of the operational parameter has remained substantially constant. It should be emphasized that the increase/decrease/non-change in the value of an operational parameter as discussed in this paragraph relates to observed increase/decrease/non-change, as opposed to predicted future increase/decrease/non-change as in the case of hidden states.

In some alternative embodiments, the observation states may be defined in an alternative manner. Namely, the observation states of each of the one or more trained hidden Markov models comprise at least: a state indicating that an associated operational parameter has a normal or nominal value and a state indicating that the associated operational parameter has an abnormal value. The abnormal value may correspond, for example, to a sufficiently sharp increase or decrease in the value of the operational parameter.

The obtaining of the one or more trained hidden Markov models in block 301 may correspond to training of one or more (pre-defined) hidden Markov models by the apparatus itself based on training data or obtaining or receiving the one or more trained hidden Markov models from another apparatus. In the latter case, said another apparatus may have trained the one or more trained hidden Markov models.

The apparatus receives, in block 302, one or more C-ITS messages from the C-ITS station. The one or more C-ITS messages comprise values for the one or more operational parameters for a plurality of successive time instances corresponding to a pre-defined sliding time window. The plurality of successive time instances may correspond to a pre-defined sliding time window. In some embodiments, the one or more C-ITS messages may also comprise information on one or more road disruption or events occurring at respective one or more time instances within the pre-defined sliding time window. The one or more C-ITS messages may be received via at least one C-ITS edge (cloud) node.

In some embodiments, the one or more operational parameters of the device may comprise at least one of: an end-to-end (E2E) delay, throughput, bandwidth, a location, a speed, a velocity, an acceleration, a direction of movement, or a transmission frequency.

In some embodiments, the one or more C-ITS messages may be or comprise one or more cooperative awareness messages (CAMs). The one or more CAMs may comprise all or at least some of the values for the one or more operational parameters for the plurality of successive time instances corresponding to the pre-defined sliding time window.

CAMs are C-ITS broadcast messages that vehicles send to each other to share important information about their current state and the surrounding environment. A CAM may comprise, for example, basic vehicle information (e.g., size, type, and/or unique identifier of the vehicle), position and speed information (e.g., current location, heading, and speed of the vehicle), acceleration and deceleration information, heading and orientation information, vehicle dynamics information (e.g., a yaw rate or wheel slip) and/or status of vehicle systems (e.g., information on status of critical vehicle systems, such as lights, brakes, or stability control).

In some embodiments, the one or more C-ITS message may comprise one or more decentralized environmental notification messages (DENMs), as will be described in further detail in connection with FIG. 4.

The apparatus determines, in block 303, one or more sets of successive observation states based on the one or more C-ITS messages. The one or more sets relate, respectively, to the one or more operational parameters. In other words, the one or more sets are operational parameter specific. The observation states correspond to the observation states of the one or more hidden Markov model defined above. A set of successive observation states may be equally called a sequence of observation state Y, as was done above.

The apparatus determines, in block 304, one or more probability distributions of most probable paths through the one or more hidden Markov models (i.e., of most probable hidden state sequences) using a Viterbi algorithm based on the one or more sets of successive observation states. In other words, for each of the one or more hidden Markov models (which are operational parameter specific), the apparatus determines a probability distribution of most probable paths through said hidden Markov model using the Viterbi algorithm based on an associated set of successive observation states. The Viterbi algorithm is a well-known dynamic programming algorithm which is specifically designed for finding the most likely sequence of hidden states in a hidden Markov model that would generate a given sequence of observations. A path through a hidden Markov model corresponds to a set of successive hidden states, i.e., a hidden state sequence. Thus, the apparatus determines, in block 304, one or more probability distributions for sets of successive hidden states of the respective one or more hidden Markov models, that is, a list of $\{V_{t,k}\}_{1, \ldots, n}$.

In some embodiments, the apparatus may initialize the one or more hidden Markov models by randomly assigning an initial hidden state for each of the one or more hidden Markov models before the determining of the one or more probability distributions of the most probable paths through the one or more hidden Markov models in block 304.

The apparatus determines, in block 305, one or more values of a trust rate based at least on an amount of dispersion in the one or more probability distributions of most probable paths. The one or more values of a trust rate correspond here, respectively, to one or more operational parameters of the C-ITS station or equally to the one or more (operational-parameter-specific) hidden Markov models. If the amount of dispersion in a probability distribution of most probable path is low, it is highly likely that the most probable path of that hidden Markov model corresponds to reality. On the other hand, if the amount of dispersion in a probability distribution of most probable path is high, multiple paths of the hidden Markov model The amount of dispersion in the one or more probability distributions in block 305 may be quantified, e.g., as standard deviations of the one or more probability distributions. Thus, the apparatus may determine, in block 305, each value of the trust rate based at least on the standard deviation of a probability distribution of most probable path. The trust rate may be defined so that its value increases when a value of the standard deviation increases and decreases when the value of the standard deviation increases. For example, the trust rate may be defined to be inversely proportional to said standard deviation or to said standard deviation raised to an nth power, where n is a real number such as 2.

In some embodiments, the determining of the trust rate in block 305 may be further based on a value of an uncertainty metric quantifying uncertainty regarding how well atypical changes (e.g., sudden changes) in the one or more operational parameters correlate with trustworthiness of the C-ITS station, as will be described in detail in connection with FIG. 4.

The apparatus classifies, in block 306, the C-ITS station as trusted or untrusted based on the one or more values of the trust rate.

In some embodiments, the classifying in block 306 may be performed using a decision tree classifier. A decision tree classifier is a machine learning model that uses a tree data structure for making decisions or predictions based on input features. Here, the (input) features of the decision tree classifier are the values (or, in some embodiments, normalized values) for the one or more operational parameters for the plurality of successive time instances corresponding to the pre-defined sliding time window, and the (output) labels of the decision tree classifier are classes for the C-ITS station (i.e., "trusted" and "untrusted"). Moreover, the class weights of the decision tree classifier for the different classes (i.e., "trusted" and "untrusted") are defined (or trained) based on the one or more values of the trust rate (i.e., $\{tr\}_{1, \ldots, n}$). Class weights are, according to a general definition, hyperparameters of decision trees which are used to adjust imbalanced datasets where one class constitutes the majority of data (here, the majority of C-ITS stations are typically trusted C-ITS stations). In other words, different (class) weights are assigned to each class during the training phase so that the contribution of each class is balanced. Class weights modify the criterion used to evaluate split points in a tree so as to take the importance of each class into account. Thus, the decision tree classifier may be specifically a weighted decision tree classifier (i.e., a decision tree classifier employing weighted split-points).

The (weighted) decision tree classifier may have been trained previously based on a training dataset by the apparatus itself. Alternatively, the (weighted) decision tree classifier may have been trained previously based on a training dataset by another apparatus and subsequently transmitted from said another apparatus to the apparatus carrying out the process of FIG. 3. Said another apparatus may also be located in the C-ITS edge cloud.

In some embodiments, the apparatus may output the classification data (i.e., a class assigned for the C-ITS station) via at least one interface. For example, the apparatus may output the classification data via said at least one interface to another apparatus for making a decision regarding granting or revoking a security or trust certificate of the C-ITS station based at least on the classification. Additionally or alternatively, the apparatus may store the classification data to at least one memory.

In some embodiments, the outputted and/or stored classification data (or outputted and/or stored classification data collected over time during multiple repetitions of the process of FIG. 3) may be subsequently used for making a decision regarding granting a security or trust certificate to the C-ITS station or rejecting (or revoking) a security or trust certificate of the C-ITS station, as mentioned above. Said decision may be made by the apparatus or said another apparatus to which the classification data was outputted. In the latter case, said another apparatus may be, e.g., a separate certificate revocation entity or device. Said separate certificate revocation entity or device may be deployed, e.g., in the C-ITS edge cloud. The certificate revocation entity or device may be, in general, configured to revoke the certificate of a particular vehicular C-ITS station if its behavior is considered suspicious (such as when the C-ITS station is classified by the trust manager as untrusted). Following the rejection or revocation of a security or trust certificate of the C-ITS station, other C-ITS stations may be configured not to trust any signals or data received from said C-ITS station.

Referring to elements 221 to 224 of FIG. 2, the actions pertaining blocks 301, 302, block 304, block 303 and blocks 305, 306 may be carried out by the data processing entity 221, the HMM builder 222, the observer 223 and the trust manager 224, respectively.

The process associated with blocks 302 to 306 may be repeated periodically (e.g., every ten minutes) ore regularly.

While the process of FIG. 3 is discussed above for evaluating trustworthiness of a single C-ITS station for simplicity, it should be appreciated that the process may be applied, in practice, for evaluating trustworthiness of a plurality of C-ITS stations.

Figure 4:
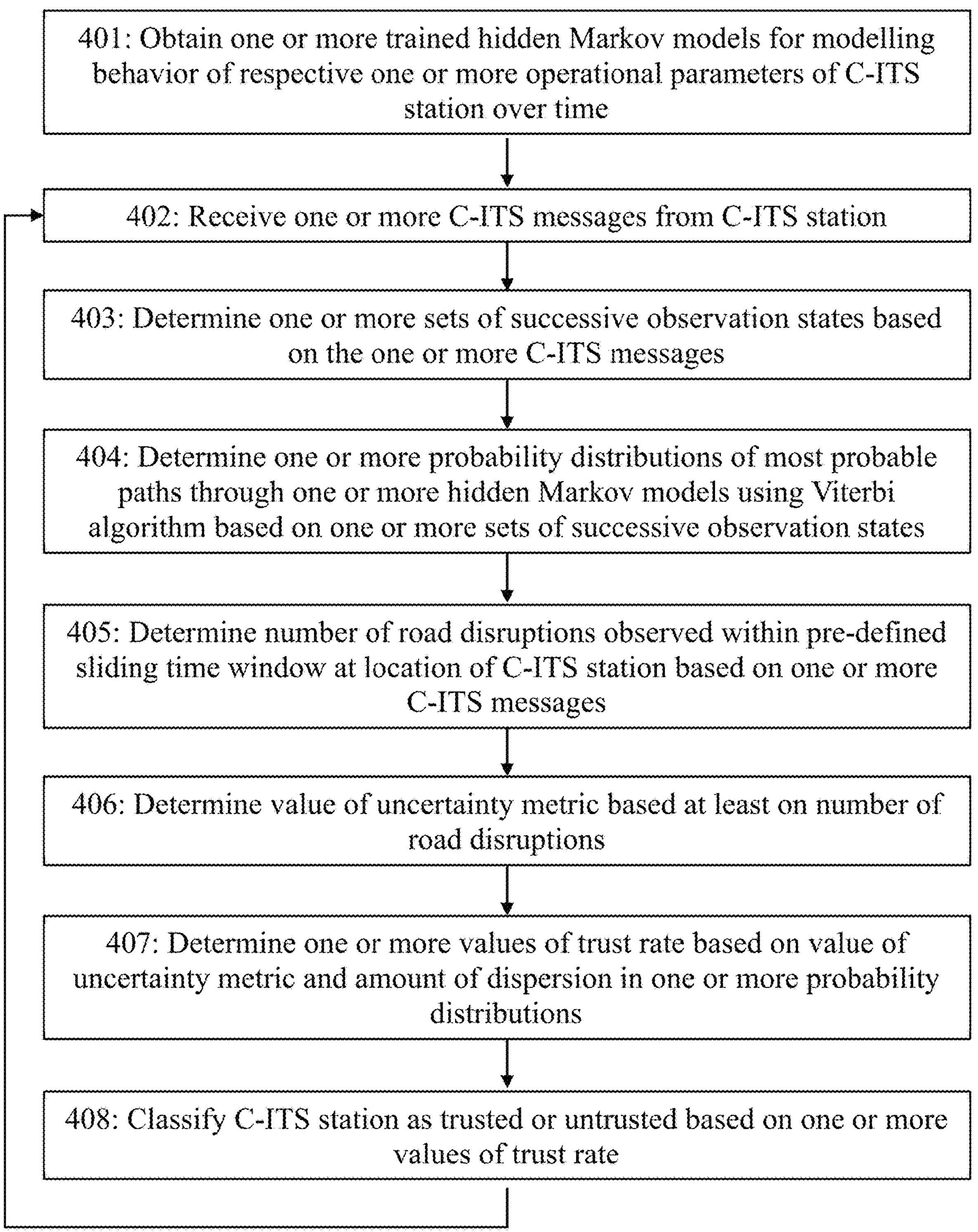

FIG. 4 illustrates another process for evaluating trustworthiness of a C-ITS station according to embodiments. The process of FIG. 4 may be carried out by a C-ITS edge cloud node or another apparatus or system comprised in or connected to a C-ITS edge cloud. The apparatus carrying out the process of FIG. 4 may correspond to element 220 of FIG. 2. The illustrated functionalities may be carried out by one or more physical devices (e.g., servers). In the following, the entity carrying out the process of FIG. 4 is called an apparatus for simplicity.

The process of FIG. 4 corresponds to a large extent to the process of FIG. 3. Namely, blocks 401 to 404, 408 of FIG. 4 may correspond fully to blocks 301 to 304, 306 of FIG. 3. Any of the features discussed in connection with FIG. 3 may apply, mutatis mutandis, in connection with FIG. 4.

As mentioned above, the initial steps of the process of FIG. 4 correspond to the initial steps of FIG. 3 and are thus not discussed here for brevity. The difference between FIGS. 3 & 4 lies in the additional steps 405, 406 for providing additional information usable for calculating the value(s) of the trust rate in block 407. Namely, the apparatus determines, in block 405, a number of road disruptions (or road events) at a location of the C-ITS station within the pre-defined sliding time window (i.e., the time window used for the observations) based on the one or more C-ITS messages.

The one or more C-ITS messages (or at least some of them) may (explicitly) comprise information on detected road event or disruptions. For example, the one or more C-ITS messages may comprise one or more decentralized environmental notification messages (DENMs) which, by definition, comprise information on road events (i.e., environmental events and/or hazards).

A DENM is a message used in C-ITS to facilitate communication between vehicles and infrastructure elements regarding environmental conditions. DENMs play a crucial role in enhancing road safety and traffic efficiency by allowing vehicles and infrastructure to share information about environmental events and hazards. A DENM may comprise, for example, event and/or hazard information (e.g., information environmental events or hazards, such as accidents, roadwork, adverse weather conditions, or obstacles on the road), geospatial information (e.g., a geographical location and extent of the reported event or hazard), time information (e.g., time of the reported event or hazard), an event type (i.e., a type of the environmental event or hazard such as an accident, slippery road conditions, or the presence of pedestrians), severity and impact information (i.e., information on the severity and potential impact of the event or hazard) and/or sender information (e.g., an identifier for the sender of the DENM.

A road disruption or event may be defined to refer to a noteworthy or significant occurrence or situation within the road environment. A road disruption or event may have an impact on traffic, safety, or the overall mobility environment (comprising, e.g., the road environment and associated communication systems). Environmental events or hazards (as described above in connection with DENMs) may be types of road disruptions or events. Examples of road disruptions or events may comprise road accidents, crashes, traffic congestion, construction zones, road closures, adverse weather conditions (e.g., heavy rain or snow, ice or fog), special events (e.g., a parade, a marathon or a festival or other large gathering of people), presence of emergency vehicles, incident involving hazardous materials, traffic signal malfunctions, public transportation disruptions, animals (e.g., moose) crossing a road and/or adverse road surface conditions (e.g., potholes). If a particular road disruption or event occurs on the road, the behavior of the vehicular C-ITS station (e.g., a car) will also be affected. Under these conditions, the behavior of the C-ITS station may suddenly change due to these external factors. Obviously, this should not affect the trustworthiness of the C-ITS station even though the behavior of the C-ITS message may be considered abnormal or anomalous. Thus, such situation may trigger a detection of false anomaly signal unless these road disruptions are taken into account in the trust rate.

The apparatus determines, in block 406, a value of an uncertainty metric based at least on the number of road disruption or events determined in block 405. The uncertainty metric quantifies uncertainty regarding how well atypical changes (e.g., sudden changes) in the one or more operational parameters correlate with trustworthiness of the C-ITS station. The same value of the uncertainty metric may be applicable for analysis of all of the one or more operational parameters (i.e., for all of the one or more hidden Markov models), that is, the value of the uncertainty metric may not be specific to a particular operational parameter or hidden Markov model.

In some embodiments, the determining of the value of the uncertainty metric in block 406 may be further based on a false detection rate. The false detection rate corresponds to a failure rate of the classification. The false detection may have a pre-defined (constant) value or it may have a value which is dynamically updated by the apparatus. The latter alternative is described in further detail in connection with FIGS. 5A and 5B.

In some embodiments, the uncertainty metric α(t) may be defined as $$\alpha(t) = \begin{cases} 1 & \text{when } t = 0, n = 0 \\ fdr * (1 - (1 - p(\text{event}))^n) & \text{when } t > 0, n \neq 0' \end{cases}, \quad (6)$$

where "fdr" is the false detection rate, p(event) is the probability of a road disruption or event occurring within the pre-defined sliding time window and n is the number of observed road disruptions or events within the pre-defined sliding time window (determined based on the one or more C-ITS messages). Thus, the term $(1-(1-p(\text{event}))^n)$ is the probability that n road disruptions or events occur within the pre-defined sliding time window. Thus, if a large number of road disruptions or events are observed, the value of the uncertainty metric is very low which indicates high uncertainty. In other words, due to the high number of road disruptions or events, it is difficult to accurately estimate the trustworthiness of the C-ITS station as the behavior of the C-ITS station may likely, in any case, be abnormal due to those road disruptions or events. In some embodiments, the false detection rate term "fdr" may be omitted from (6) or it may have a pre-defined constant value.

The apparatus determines, in block 407, one or more values of the trust rate based on an amount of dispersion in the (respective) one or more probability distributions of most probable paths (like described previously in connection with block 305 of FIG. 3) as well as on the value of the uncertainty metric.

In some embodiments, the trust rate "tr" for a given operational parameter (or equally for a given hidden Markov model) may be defined as $$tr(t) = \frac{\alpha(t)}{(SD(V_{t,k}(t)))^2}, \quad (7),$$

where "SD" stands for standard deviation (calculated over index k) and $V_{t,k}$ is the probability distribution of the most probable hidden state sequences (i.e., of the most probable path). In some embodiments, the squaring in (7) may be omitted (i.e., the exponent '2' may be replaced with 1) or the exponent '2' may be replaced with another exponent larger than 0 (or possibly larger than 1).

Subsequently, the one or more values of the trust rate are used, by the apparatus, for classifying the C-ITS station as trusted or untrusted in block 408, similar to as described previously in connection with block 306 of FIG. 3.

Referring to elements 221 to 224 of FIG. 2, the actions pertaining blocks 401, 402, block 404, block 403, 405, 406 and blocks 407, 408 may be carried out by the data processing entity 221, the HMM builder 222, the observer 223 and the trust manager 224, respectively.

The process associated with blocks 402 to 408 may be repeated periodically (e.g., every ten minutes) or regularly.

Figure 5A:
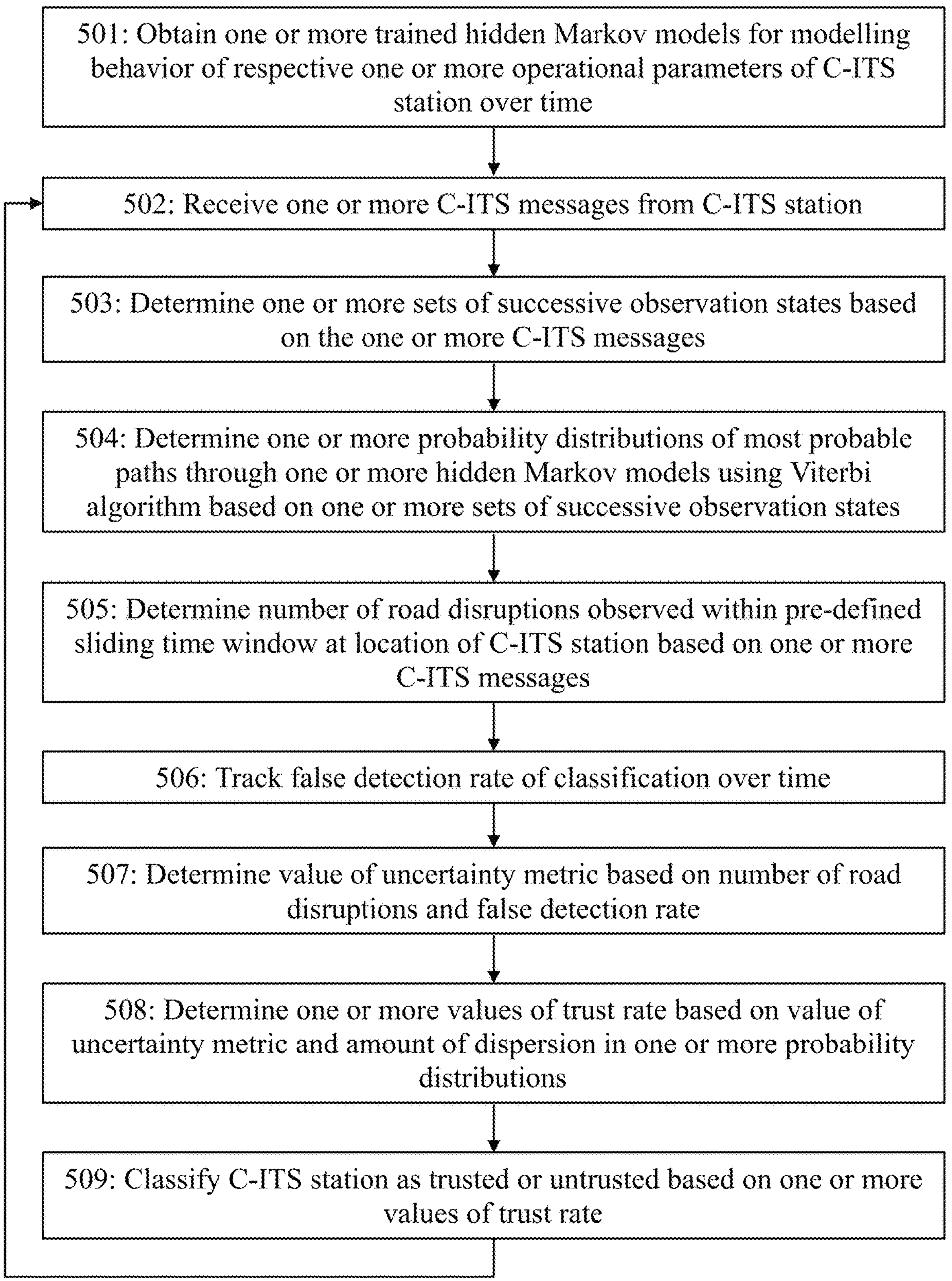
Figure 5B:
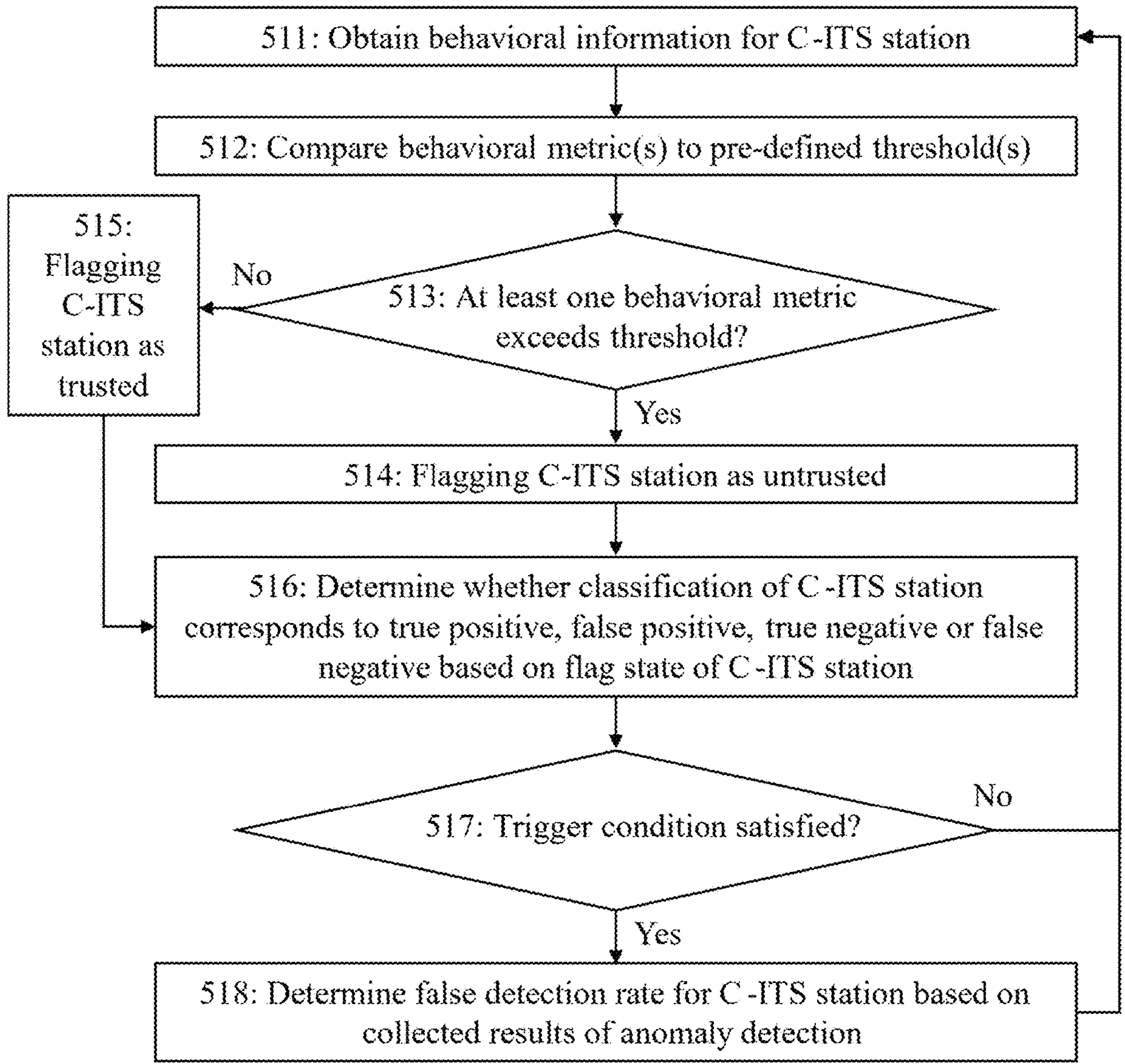

FIG. 5A illustrates another process for evaluating trustworthiness of a C-ITS station according to embodiments while FIG. 5B illustrates in further detail one implementation of block 506 of FIG. 5 according to embodiments. The processes of FIGS. 5A and/or 5B may be carried out by a C-ITS edge cloud node or another apparatus or system comprised in or connected to a C-ITS edge cloud. The apparatus carrying out the processes of FIGS. 5A and/or 5B may correspond to element 220 of FIG. 2. The illustrated functionalities may be carried out by one or more physical devices (e.g., servers). In the following, the entity carrying out the process of FIGS. 5A and 5B is called an apparatus for simplicity.

The process of FIG. 5A corresponds to a large extent to the processes of FIGS. 3 and/or 4. Namely, blocks 501 to 505, 508 to 509 of FIG. 5A may correspond fully to blocks 401 to 408 of FIG. 4. Any of the features discussed in connection with FIG. 3 and/or FIG. 4 may apply, mutatis mutandis, in connection with FIG. 5A.

As mentioned above, the initial steps of the process of FIG. 5A correspond to the initial steps of FIG. 4 (and/or FIG. 3) and thus not discussed here for brevity. The difference between FIG. 5A and FIGS. 3 & 4 lies in the additional step 506. Namely, the apparatus tracks, in block 506, a false detection rate of the classification process over time (e.g., over the pre-defined sliding time window). As discussed in connection with previous embodiments, the classification process may be carried out periodically or regularly for one or more C-ITS stations. The apparatus monitors, during these periodic repetitions, the false detection rate, that is, the failure rate of the classification. The false detection rate may be defined as the number of false detections (i.e., false classifications) divided by the total number of detections (or classifications).

The false detection rate may be determined as follows. The apparatus may obtain (periodically or regularly) behavioral information (e.g., values of metrics describing number of speed violations and/or average distance between C-ITS stations) on the C-ITS station from the C-ITS station, perform anomaly detection based on the classifications of the C-ITS station and on the behavioral information of the C-ITS station (that is, on whether the behavioral information indicates normal or abnormal behavior), and calculate the false detection rate based on results of the anomaly detection. The determining of the false detection rate is discussed in further detail according to some embodiments in connection with FIG. 5B, following the discussion on FIG. 5A.

The apparatus determines, in block 507, a value of an uncertainty metric based on the number of road disruptions or events determined in block 505 as well as on the value of the false detection rate determined in block 506. The value of the uncertainty metric α(t) may be determined, for example, according to (6).

The following steps 508 to 509 of FIG. 5A may be carried out as described, e.g., in connection with blocks 305 to 306 of FIG. 3 and/or blocks 407 to 408 of FIG. 4 above.

As mentioned above, FIG. 5B illustrates a process for tracking (i.e., periodically or regularly calculating) the false detection rate based on anomaly detection on behavioral information of a C-ITS station. The process of FIG. 5B may be executed in parallel with the other processes of FIG. 5A. FIG. 5B illustrates the tracking of the false detection rate for one C-ITS station (being specifically a vehicular C-ITS station) though it should be appreciated that a corresponding process may be carried out, in practice, in parallel for multiple C-ITS stations. The process of FIG. 5B may be carried out by the apparatus carrying out the process of FIG. 5A (e.g., by the trust manager 224 of FIG. 2).

Initially, the apparatus obtains, in block 511, behavioral information of the C-ITS station from the C-ITS station. Said behavioral information for the C-ITS station (assumed here to be a vehicular C-ITS station) may comprise one or more values of one or more behavioral metrics. Said one or more behavioral metrics may comprise, for example, number of speed violations and/or number of excessive speed violations (e.g., exceeding a speed limit by at least a pre-defined amount) and/or average distance between (vehicular) C-ITS stations (that is, between the present C-ITS station and any other (vehicular) C-ITS stations). Said one or more behavioral metrics may be given relative to a pre-defined duration (e.g., an hour), that is, number of (excessive) speed violations within the last pre-defined duration and/or the average distance between (vehicular) C-ITS stations within the last pre-defined duration. In some embodiments, the pre-defined duration may correspond to the pre-defined sliding time window. The C-ITS station(s) may be configured to transmit said behavioral information regularly or periodically (e.g., at periodic time instances corresponding to the ends of classification operations) to the apparatus. Alternatively, the apparatus may poll, in block 511, the C-ITS station(s) regularly or periodically (e.g., at periodic time instances corresponding to the ends of classification operations) causing them to transmit said behavioral information to the apparatus. In either case, the behavioral information may be obtained using the observer 223 of FIG. 2.

The anomaly detection performed based on said behavioral information obtained from the C-ITS station comprises the following steps. The apparatus compares, in block 512, one or more values of each behavioral metric defined in the behavioral information for the C-ITS station to a pre-defined threshold for that behavioral metric. In response to at least one value of any of the one or more behavioral metrics defined for the C-ITS station exceeding the associated pre-defined threshold in block 513, the apparatus flags, in block 514, the C-ITS station as untrusted. On the other hand, in response to no value of any of the one or more behavioral metrics defined for the C-ITS station exceeding the associated pre-defined threshold in block 513, the apparatus flags, in block 515, the C-ITS station as trusted. Here, exceeding the pre-defined threshold may correspond, e.g., to the number of (excessive) speed violations within a pre-defined duration (e.g., an hour) exceeding a pre-defined threshold for the number of (excessive) speed violation within said pre-defined duration or to the average distance between (vehicular) C-ITS stations exceeding a pre-defined threshold for the average distance between (vehicular) C-ITS stations. It should be emphasized that this flagging operation is independent of the classification operation carried out for the C-ITS station. As a final step of the anomaly detection, the apparatus determines, in block 516, whether the classification of the C-ITS corresponds to a true positive, a false positive, a true negative or a false negative based on a flag state (i.e., "trusted" or "untrusted") of the C-ITS station. In other words, the apparatus compares, in block 516, the most recent classification of the C-ITS station to the flag state defined in block 514 or 515 to see if they match. If they do not match, an anomaly (i.e., a false positive or a false negative) is detected.

In response to a pre-defined trigger condition not being satisfied in block 517, the apparatus repeats action pertaining to blocks 511 to 517. The pre-defined trigger may be specific to the C-ITS station. The pre-defined trigger condition may be, for example, that a pre-defined number of repetitions of blocks 511 to 516 has been reached or that a pre-defined timer (corresponding to the false detection rate) has expired. During these repetitions, the actions relating to blocks 502 to 509 of FIG. 5A are carried out in parallel.

In response to the pre-defined trigger condition being satisfied in block 517, the apparatus determines, in block 518, a false detection rate for the C-ITS station based on the collected results of anomaly detected (determined in one or more repetitions of block 516). The false detection rate may be defined simply as a ratio between the number of classifications deemed to be false (i.e., corresponding to false positives and/or negatives) and the number of the total number of classifications. The pre-defined trigger (i.e., a timer or a counter counting repetitions of blocks 511 to 517) may be reset, by the apparatus, following the determining of the false detection rate in block 518.

In some alternative embodiments, the process of FIG. 5B may be carried out by another apparatus communicatively connected to the apparatus carrying out the process of FIG. 5A. In such embodiments, said another apparatus may be configured to transmit the determined false detection rate to the apparatus regularly or periodically or in response to it being determined. Thus, tracking of the false detection rate in block 506 of FIG. 5A may correspond to receiving one or more values of false detection rate for the C-ITS station (or, in general, for one or more C-ITS station via at least one interface from said another apparatus).

As was described above, the one or more hidden Markov models may be trained before (and possibly during) the execution of any of the processes of FIGS. 3, 4, 5A and 5B. This training may be carried out either by the apparatus which performs also the "online" calculations or by another, separate apparatus. FIG. 6 illustrates a process according to embodiments for training the one or more hidden Markov models. The process of FIG. 6 may be carried out by a C-ITS edge cloud node or another apparatus or system comprised in or connected to a C-ITS edge cloud. The apparatus carrying out the process of FIG. 6 may correspond to element 220 of FIG. 2 or be an apparatus communicatively connected to element 220 of FIG. 2. The illustrated functionalities may be carried out by one or more physical devices (e.g., servers). In the following, the entity carrying out the process of FIG. 6 is called an apparatus for simplicity.

Referring to FIG. 6, the apparatus maintains, in block 601, in the at least one memory, one or more untrained hidden Markov models for modelling behavior of respective one or more operational parameters of a C-ITS station over time. The hidden states of the one or more trained hidden Markov models define expected future behavior of the respective one or more operational parameters and observation states of the one or more trained hidden Markov models define current states of the respective one or more operational parameters. As the one or more hidden Markov models are untrained, the emission matrices of the one or more hidden Markov models (which define probabilities between observation and hidden states) do not yet have appropriate forms for accurately modelling behavior of respective one or more operational parameters of the C-ITS station over time.

The apparatus obtains, in block 602, training data comprising, for each of the one or more operational parameters (i.e., for each of the one or more untrained hidden Markov models), a set of observation states and a corresponding set of known hidden states. The training data corresponds to desired behavior of the one or more operational parameters of the C-ITS station. The training data may have been collected/generated based on historical operational data of the C-ITS station.

The apparatus trains, in block 603, one or more emission matrices of the respective one or more untrained hidden Markov models based on the training data to form one or more trained hidden Markov models. In other words, the apparatus trains the probabilities associated with a given observation state leading to a given hidden state in the one or more hidden Markov models. The apparatus may initialize each emission matrix by uniformly segmenting the associated training data and computing the global mean and variance for each segment.

If the apparatus is intended to also perform online calculations using the one or more hidden Markov models, the apparatus performs, in block 604*a*, any of the processes described above in connection with FIGS. 3, 4 and 5A (or FIG. 5A in combination with FIG. 5B).

Alternatively, if the apparatuses performing the (offline) training and performing online calculations are separate apparatuses, the apparatus outputs, in block 604*b*, the one or more trained hidden Markov models via at least one interface. The one or more trained hidden Markov models may be outputted, directly or via one or more other apparatuses, to the apparatus which is configured to perform the classification based on the one or more hidden Markov models.

While the embodiments discussed above were directed specifically to a C-ITS use case, in other embodiments, any of the functionalities described above may be applied, mutatis mutandis, to Industry 4.0 space. In such embodiments, the terms "C-ITS wireless communication system", "C-ITS message" and "C-ITS edge cloud" may, for example, be replaced simply with terms "industrial IoT wireless communication system", "message" and "edge cloud" (or "industrial IoT edge cloud"), respectively. In these embodiments, the C-ITS stations 211 to 213 of the C-ITS wireless communication system 210 of FIG. 2 may be replaced with mobile (industrial) IoT devices (e.g., robots and/or drones) of a wireless communication system 210. A mobile IoT device may be an IoT device capable of autonomous movement (e.g., a drone or a robot). Also in this use case, the mobile IoT devices may be configured to exchange messages with each other and with an edge cloud. Said mobile IoT device may operate in an industrial environment such as in a smart factory. In this use case, the embodiments may be employed, e.g., for detecting misbehavior of mobile IoT devices such as robots and drones. Based on the mobile IoT devices being classified as trusted or untrusted, the apparatus or another apparatus to which the classification information is outputted may grant or revoke a security or trust certification of the mobile IoT device, similar to as described at length in connection with the C-ITS use case.

Thus, the process according to embodiments corresponding to FIG. 3 may, alternatively, comprise the following steps:

- obtaining, in block 301, one or more trained hidden Markov models for modelling behavior of respective one or more operational parameters of a mobile IoT device over time, wherein hidden states of the one or more trained hidden Markov models define expected future behavior of the respective one or more operational parameters and observation states of the one or more trained hidden Markov models define current states of the respective one or more operational parameters;
- receiving, in block 302, one or more messages from the mobile IoT device, wherein the one or more messages comprise values for the one or more operational parameters for a plurality of successive time instances corresponding to a pre-defined sliding time window;
- determining, in block 303, one or more sets of successive observation states based on the one or more messages, wherein the one or more sets relate, respectively, to the one or more operational parameters;
- determining, in block 304, one or more probability distributions of most probable paths through the one or more hidden Markov models using a Viterbi algorithm based on the one or more sets of successive observation states;
- determining, in block 305, one or more values of a trust rate based at least on an amount of dispersion in the one or more probability distributions; and classifying, in block 306, the mobile IoT device as trusted or untrusted based on the one or more values of the trust rate.

In some embodiments, the above process may further comprise (similar to blocks 405 to 406 of FIG. 4):

- determining a number of disruptions (e.g., a disruption in an industrial environment such as a factory floor) within a pre-defined sliding time window at a location of the mobile IoT device during the plurality of successive time instances based on the one or more messages; and
- determining a value of an uncertainty metric based at least on the number of disruptions, wherein the uncertainty metric quantifies uncertainty regarding how well atypical changes in the one or more operational parameters correlate with trustworthiness of the mobile IoT device.

In these embodiments, the determining of the one or more values of the trust rate may be further based on the value of the uncertainty metric. The one or more messages may (explicitly comprise information on the number of the disruptions).

The embodiments described above provide at least the following advantages:

- the trustworthiness of C-ITS station in C-ITS domain or (mobile) IoT devices in the (industrial) IoT domain is increased,
- the dynamic calculation of the trust rate allows for real-time implementation since it does not require a prior training step, as is the case, e.g., for solutions based on a neural networks,
- the safety requirements of automotive certification processes are satisfied as the embodiments align with the need to track and detect misbehaviors in connected and autonomous driving systems, and
- improved guarantees for CAV (Connected and Automated Vehicle) safety may be provided, which helps to increase the acceptance rate of new generations of vehicles among the public.

The blocks, related functions, and information exchanges described above by means of FIGS. 2 to 4, 5A, 5B and 6 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

FIG. 7 provides an apparatus 701 according to some embodiments. Specifically, FIG. 7 may illustrate an apparatus 701 communicatively connected to or comprised in an edge cloud of a wireless communication system (or network). Here, the wireless communication system may be, e.g., a C-ITS wireless communication system or an industrial IoT wireless communication system. The apparatus 701 may be an apparatus for training one or more hidden Markov models and/or for performing (online) calculations using the one or more trained hidden Markov models.

The apparatus 701 may comprise one or more communication control circuitry 720, such as at least one processor, and at least one memory 730, including one or more algorithms 731 (instructions), such as a computer program code (software) wherein the at least one memory and the computer program code (software) are configured, with the at least one processor, to cause the apparatus 701 to carry out any one of the exemplified functionalities of the apparatus described above. Said at least one memory 730 may also comprise at least one database 732.

When the one or more communication control circuitry 720 comprises more than one processor, the apparatus 701 may be a distributed device wherein processing of tasks takes place in more than one physical unit. Each of the at least one processor may comprise one or more processor cores. A processing core may comprise, for example, a Cortex-A8 processing core manufactured by ARM Holdings or a Zen processing core designed by Advanced Micro Devices Corporation. The one or more communication control circuitry 720 may comprise at least one Qualcomm Snapdragon and/or Intel Atom processor. The one or more communication control circuitry 720 may comprise at least one application-specific integrated circuit (ASIC). The one or more control circuitry 720 may comprise at least one field-programmable gate array (FPGA).

Referring to FIG. 7, the one or more communication control circuitry 720 of the apparatus 701 are configured to carry out functionalities of the apparatus described above by means of any of FIGS. 2 to 4, 5A, 5B and 6 using one or more individual circuitries. It is also feasible to use specific integrated circuits, such as ASIC (Application Specific Integrated Circuit) or other components and devices for implementing the functionalities in accordance with different embodiments.

Referring to FIG. 7, the apparatus 701 may further comprise different interfaces (I/F) 710 such as one or more communication interfaces comprising hardware and/or software for realizing communication connectivity according to one or more communication protocols. The one or more communication interfaces 710 may comprise, for example, at least one communication interface between the apparatus 701 and an edge cloud or one or more devices or nodes of the edge cloud. The one or more communication interfaces 710 may comprise, for example, at least one communication interface between the apparatus 701 and one or more C-ITS stations (or one or more IoT devices in embodiments relating to Industry 4.0).

In some embodiments, the one or more communication interfaces 710 may comprise at least one communication interface between the apparatus 701, being an apparatus for training one or more hidden Markov models, and another apparatus for performing (online) calculations using the one or more trained hidden Markov model.

The one or more communication interfaces 710 may comprise standard well-known components such as an amplifier, filter, frequency-converter, (de)modulator, and encoder/decoder circuitries, controlled by the corresponding controlling units, and one or more antennas. The apparatus 701 may also comprise one or more user interfaces.

Referring to FIG. 7, the memory 730 may be implemented using any suitable data storage technology, such as semiconductor based memory devices, flash memory, magnetic memory devices and systems, optical memory devices and systems, fixed memory and removable memory.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hard-ware circuit or processor (or multiple processors) or a portion of a hardware circuit or processor and its (or their) accompanying software and/or firmware.

In an embodiment, at least some of the processes described in connection with FIGS. 2 to 4, 5A, 5B and 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, filter (low-pass, high-pass, bandpass and/or bandstop), sensor, circuitry, inverter, capacitor, inductor, resistor, operational amplifier, diode and transistor. In an embodiment, the at least one processor, the memory, and the computer program code form processing means or comprises one or more computer program code portions for carrying out one or more operations according to any one of the embodiments of FIGS. 3, 4, 5A, 5B and 6 or operations thereof. In some embodiments, at least some of the processes may be implemented using discrete components.

According to an embodiment, there is provided an apparatus comprising means for performing:

obtaining one or more trained hidden Markov models for modelling behavior of respective one or more operational parameters of a device over time, wherein hidden states of the one or more trained hidden Markov models define expected future behavior of the respective one or more operational parameters and observation states of the one or more trained hidden Markov models define current states of the respective one or more operational parameters, the device being a C-ITS station (e.g., a vehicular C-ITS station) or a mobile IoT device;

receiving one or more messages from the device, wherein the one or more messages comprise values for the one or more operational parameters for a plurality of successive time instances corresponding to a pre-defined sliding time window;

determining one or more sets of successive observation states based on the one or more messages, wherein the one or more sets relate, respectively, to the one or more operational parameters;

determining one or more probability distributions of most probable paths through the one or more hidden Markov models using a Viterbi algorithm based on the one or more sets of successive observation states;

determining one or more values of a trust rate based at least on an amount of dispersion in the one or more probability distributions; and classifying the device as trusted or untrusted based on the one or more values of the trust rate.

According to an embodiment, there is provided an apparatus comprising means for performing:

maintaining, in at least one memory, one or more untrained hidden Markov models for modelling behavior of respective one or more operational parameters of a device over time, wherein hidden states of the one or more trained hidden Markov models define expected future behavior of the respective one or more operational parameters and observation states of the one or more trained hidden Markov models define current states of the respective one or more operational parameters, the device being a cooperative intelligent transport systems, C-ITS, station or a mobile Internet of Things, IoT, device;

obtaining training data comprising, for each of the one or more operational parameters, a set of observation states and a corresponding set of known hidden states;

training one or more emission matrices of the respective one or more untrained hidden Markov models based on the training data to form one or more trained hidden Markov models; and outputting the one or more trained hidden Markov models via at least one interface.

Embodiments as described may also be carried out, fully or at least in part, in the form of a computer process defined by a computer program or portions thereof. Embodiments of the methods described in connection with FIGS. 3, 4, 5A, 5B and 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The term “non-transitory”, as used herein, is a limitation of the medium itself (that is, tangible, not a signal) as opposed to a limitation on data storage persistency (for example, RAM vs. ROM).

Reference throughout this specification to one embodiment or an embodiment means that a particular feature, structure, or characteristic described in connection with the embodiment is included in at least one embodiment of the present solution. Thus, appearances of the phrases “in one embodiment” or “in an embodiment” in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present solution may be referred to herein along with alternatives for the various components thereof. It is understood that such embodiments, examples, and alternatives are not to be construed as de facto equivalents of one another, but are to be considered as separate and autonomous representations of the present solution.

Even though embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

INDUSTRIAL APPLICABILITY

At least some embodiments find industrial application in wireless communications.

The invention claimed is:

1. An apparatus comprising:

at least one processor; and at least one memory storing instructions that, when executed by the at least one processor, cause the apparatus at least to perform:

obtaining one or more trained hidden Markov models for modelling behavior of respective one or more operational parameters of a device over time, wherein hidden states of the one or more trained hidden Markov models define expected future behavior of the respective one or more operational parameters and observation states of the one or more trained hidden Markov models define current states of the respective one or more operational parameters, the device being a cooperative intelligent transport systems, C-ITS, station or a mobile Internet of Things, IoT, device;

receiving one or more messages from the device, wherein the one or more messages comprise values for the one or more operational parameters for a plurality of successive time instances corresponding to a pre-defined sliding time window;

determining one or more sets of successive observation states based on the one or more messages, wherein the one or more sets relate, respectively, to the one or more operational parameters;

determining one or more probability distributions of most probable paths through the one or more hidden Markov models using a Viterbi algorithm based on the one or more sets of successive observation states;

determining one or more values of a trust rate based at least on an amount of dispersion in the one or more probability distributions; and classifying the device as trusted or untrusted based on the one or more values of the trust rate.

2. The apparatus of claim 1, wherein the at least one memory and the instructions are configured, with the at least one processor, to cause the apparatus to perform, following the classifying:

outputting a classification of the device via at least one interface to another apparatus for making a decision regarding granting or revoking a security or trust certificate of the device based at least on the classification.

3. The apparatus of claim 1, wherein the device is the mobile IoT device, the mobile IoT device being a drone or a mobile robot.

4. The apparatus of claim 1, wherein the device is the C-ITS station, and the one or more messages are C-ITS messages.

5. The apparatus of claim 4, wherein the one or more C-ITS messages comprise one or more cooperative awareness messages, CAMs, and/or one or more decentralized environmental notification messages, DENMs.

6. The apparatus according to claim 4, wherein the at least one memory and the instructions are configured, with the at least one processor, to cause the apparatus to receive the one or more C-ITS messages from the C-ITS station via at least one C-ITS edge node.

7. The apparatus according to claim 4, wherein the C-ITS station is a vehicular C-ITS station.

8. The apparatus of claim 7, wherein the at least one memory and the instructions are configured, with the at least one processor, to cause the apparatus to perform:

determining a number of road disruptions observed within the pre-defined sliding time window at a location of the C-ITS station based on the one or more C-ITS messages; and determining a value of an uncertainty metric based at least on the number of road disruptions, wherein the uncertainty metric quantifies uncertainty regarding how well atypical changes in the one or more operational parameters correlate with trustworthiness of the C-ITS station, the determining of the one or more values of the trust rate being further based on the value of the uncertainty metric.

9. The apparatus of claim 8, wherein the at least one memory and the instructions are configured, with the at least one processor, to cause the apparatus to perform:

repeating periodically or regularly the receiving of the one or more messages, the determining of the one or more sets of successive observations states, the determining of the one or more probability distributions, the determining of the number of road disruptions, the determining of the value of the uncertainty metric, the determining of the one or more values of the trust rate and the classifying.

10. The apparatus of claim 9, wherein the at least one memory and the instructions are configured, with the at least one processor, to cause the apparatus to perform:

tracking a false detection rate of classifications of the C-ITS station over time; and determining the value of the uncertainty metric further based on the false detection rate.

11. The apparatus of claim 10, wherein tracking of the false detection rate comprises:

obtaining behavioral information on the C-ITS station from the C-ITS station;

performing anomaly detection based on the classifications of the C-ITS station and the behavioral information of the C-ITS station; and calculating the false detection rate based on results of the anomaly detection.

12. The apparatus according to claim 1, wherein the obtaining of the one or more hidden Markov model comprises either:

maintaining, in the at least one memory, one or more untrained hidden Markov models for modelling behavior of respective one or more operational parameters of the device over time, obtaining training data comprising, for each of the one or more operational parameters, a set of observation states and a corresponding set of known hidden states, and training one or more emission matrices of the respective one or more untrained hidden Markov models based on the training data to form the one or more trained hidden Markov models; or receiving the one or more trained hidden Markov models from another apparatus.

13. The apparatus according to claim 1, wherein the one or more operational parameters of the device comprise at least one of: an end-to-end, E2E, delay, throughput, bandwidth, a location, a speed, a velocity, an acceleration, a direction of movement, or a transmission frequency.

14. The apparatus according to claim 1, wherein the hidden states of each of the one or more trained hidden Markov models comprise at least: a state indicating future increase in an associated operational parameter, a state indicating future decrease in the associated operational parameter and a state indicating that the associated operational parameter remains substantially unchanged in the future; or wherein the hidden states of each of the one or more trained hidden Markov models comprise at least: one or more states indicating future increase of respective one or more different magnitudes in an associated operational parameter, one or more states indicating future decrease of respective one or more different magnitudes in the associated operational parameter and a state indicating that the associated operational parameter remains substantially unchanged in the future.

15. The apparatus according to claim 1, wherein the observation states of each of the one or more trained hidden Markov models comprise at least: a state indicating that an associated operational parameter has a normal or nominal value and a state indicating that the associated operational parameter has an abnormal value; or wherein the observation states of each of the one or more trained hidden Markov models comprise at least: a state indicating an increase in an associated operational parameter, a state indicating a decrease in the associated operational parameter and a state indicating that the associated operational parameter is substantially unchanged; or wherein the observation states of each of the one or more trained hidden Markov models comprise at least: one or more states indicating increase of respective one or more different magnitudes in an associated operational parameter, one or more states indicating decrease of respective one or more different magnitudes in the associated operational parameter and a state indicating that the associated operational parameter is substantially unchanged.

16. The apparatus according to claim 1, wherein, in the determining of the one or more values of the trust rate, the amount of dispersion in the one or more probability distributions is quantified as a standard deviation in the one or more probability distributions.

17. The apparatus of claim 16, wherein the trust rate is defined so that its value increases when a value of the standard deviation decreases and decreases when the value of the standard deviation increases.

18. The apparatus according to claim 1, wherein the at least one memory and the instructions are configured, with the at least one processor, to cause the apparatus to perform the classifying using a weighted decision tree classifier, class weights of the weighted decision tree classifier being defined based on the one or more values of the trust rate.

19. A method comprising:

obtaining one or more trained hidden Markov models for modelling behavior of respective one or more operational parameters of a device over time, wherein hidden states of the one or more trained hidden Markov models define expected future behavior of the respective one or more operational parameters and observation states of the one or more trained hidden Markov models define current states of the respective one or more operational parameters, the device being a cooperative intelligent transport systems, C-ITS, station or a mobile Internet of Things, IoT, device;

receiving one or more messages from the device, wherein the one or more messages comprise values for the one or more operational parameters for a plurality of successive time instances corresponding to a pre-defined sliding time window;

determining one or more sets of successive observation states based on the one or more messages, wherein the one or more sets relate, respectively, to the one or more operational parameters;

determining one or more probability distributions of most probable paths through the one or more hidden Markov models using a Viterbi algorithm based on the one or more sets of successive observation states;

determining one or more values of a trust rate based at least on an amount of dispersion in the one or more probability distributions; and classifying the device as trusted or untrusted based on the one or more values of the trust rate.

20. A non-transitory computer readable medium having stored thereon instructions that, when executed by a computing device, cause the computing device to perform:

obtaining one or more trained hidden Markov models for modelling behavior of respective one or more operational parameters of a device over time, wherein hidden states of the one or more trained hidden Markov models define expected future behavior of the respective one or more operational parameters and observation states of the one or more trained hidden Markov models define current states of the respective one or more operational parameters, the device being a cooperative intelligent transport systems, C-ITS, station or a mobile Internet of Things, IoT, device;

receiving one or more messages from the device, wherein the one or more messages comprise values for the one or more operational parameters for a plurality of successive time instances corresponding to a pre-defined sliding time window;

determining one or more sets of successive observation states based on the one or more messages, wherein the one or more sets relate, respectively, to the one or more operational parameters;

determining one or more probability distributions of most probable paths through the one or more hidden Markov models using a Viterbi algorithm based on the one or more sets of successive observation states;

determining one or more values of a trust rate based at least on an amount of dispersion in the one or more probability distributions; and classifying the device as trusted or untrusted based on the one or more values of the trust rate.

* * * * *